United States Patent
Barrass

(10) Patent No.: US 9,806,657 B2
(45) Date of Patent: Oct. 31, 2017

(54) METHOD AND APPARATUS FOR CONTROL OF SWITCHED RELUCTANCE MOTORS

(71) Applicant: Sevcon Limited, Tyne and Wear (GB)

(72) Inventor: Peter Barrass, Tyne and Wear (GB)

(73) Assignee: Sevcon Limited, Tyne and Wear (GB)

( * ) Notice: Subject to any disclaimer, the term of this patent is extended or adjusted under 35 U.S.C. 154(b) by 0 days.

(21) Appl. No.: 15/035,761

(22) PCT Filed: Nov. 12, 2014

(86) PCT No.: PCT/GB2014/053356
§ 371 (c)(1),
(2) Date: May 11, 2016

(87) PCT Pub. No.: WO2015/071662
PCT Pub. Date: May 21, 2015

(65) Prior Publication Data
US 2016/0285402 A1 Sep. 29, 2016

(30) Foreign Application Priority Data

Nov. 12, 2013 (GB) .................................. 1319967.4

(51) Int. Cl.
*H02K 21/00* (2006.01)
*H02P 25/08* (2016.01)
(Continued)

(52) U.S. Cl.
CPC .............. *H02P 25/08* (2013.01); *H02K 1/14* (2013.01); *H02K 1/246* (2013.01); *H02P 25/092* (2016.02); *H02P 25/0925* (2016.02); *H02P 6/22* (2013.01)

(58) Field of Classification Search
CPC ............. H02P 6/16; H02P 25/08; H02P 1/163
See application file for complete search history.

(56) References Cited

U.S. PATENT DOCUMENTS 5,739,662 A  4/1998 Li
5,866,964 A  2/1999 Li
(Continued)

FOREIGN PATENT DOCUMENTS

EP  0206212  12/1986
JP  62-193594  8/1987
(Continued)

OTHER PUBLICATIONS

International Search Report and the Written Opinion dated Mar. 9, 2015 From the International Searching Authority Re. Application No. PCT/GB2014/053356.
(Continued)

*Primary Examiner* — Karen Masih

(57) ABSTRACT

A short pitched switched reluctance motor control apparatus comprising a voltage provider comprising a first coupling and a second coupling configured to be coupled to a phase winding of the switched reluctance motor for applying a voltage to drive current in the winding between the first and second coupling is disclosed. The apparatus further comprises a controller configured to apply a first voltage pulse to the first coupling, and to apply a second voltage pulse to the second coupling, wherein the start of the second pulse is delayed with respect to the start of the first pulse, and the end of the first pulse is delayed with respect to the end of the second pulse.

16 Claims, 2 Drawing Sheets

(51) Int. Cl.
*H02P 25/092* (2016.01)
*H02K 1/14* (2006.01)
*H02K 1/24* (2006.01)
*H02P 6/22* (2006.01)

(56) References Cited

U.S. PATENT DOCUMENTS

| | | | |
|---|---|---|---|
| 6,087,799 A | 7/2000 | Turner | |
| 6,269,013 B1 | 7/2001 | Honma et al. | |
| 7,248,006 B2* | 7/2007 | Bailey | H02K 1/141 |
| | | | 318/400.4 |
| 2002/0017891 A1 | 2/2002 | Honma et al. | |
| 2004/0052125 A1 | 3/2004 | Tankard | |
| 2008/0129244 A1 | 6/2008 | Randall | |

FOREIGN PATENT DOCUMENTS

| | | |
|---|---|---|
| JP | 2006-296120 | 10/2006 |
| WO | WO 2015/071662 | 5/2015 |

OTHER PUBLICATIONS

Patents Act 1977: Combined Search and Examination Report Under Sections 17 and 18(3) dated Dec. 12, 2013 From the Intellectual Property Office of the United Kingdom of Great Britain Re. Application No. GB1319967.4.
Patents Act 1977: Combined Search and Examination Report Under Sections 17 and 18(4) dated Jan. 7, 2016 From the Intellectual Property Office of the United Kingdom of Great Britain Re. Application No. GB1508856.0.
Patents Act 1977: Search Report Under Sections 17(6) dated Apr. 14, 2014 From the Intellectual Property Office of the United Kingdom of Great Britain Re. Application No. GB1319967.4.

\* cited by examiner one time slice

METHOD AND APPARATUS FOR CONTROL OF SWITCHED RELUCTANCE MOTORS

RELATED APPLICATIONS

This application is a National Phase of PCT Patent Application No. PCT/GB2014/053356 having International filing date of Nov. 12, 2014, which claims the benefit of priority of United Kingdom Patent Application No. 1319967.4 filed on Nov. 12, 2013. The contents of the above applications are all incorporated by reference as if fully set forth herein in their entirety.

The present disclosure relates to the control of switched reluctance electric motors, and more particularly to apparatus and methods for controlling the power supply to switched reluctance motors, and still more particularly to controlling the power supply to short pitched switched reluctance motors.

Switched reluctance, SR, motors use field coils wound onto a stator and a solid salient-pole rotor made of soft magnetic material (such as laminated-steel). The rotor does not generally carry any windings. The stator windings are arranged on angularly separated teeth. When power is applied to a stator winding, the rotor's magnetic reluctance tends to align the rotor pole with the tooth (magnetic pole) of the stator that carries that winding. In order to rotate the rotor, the windings of successive stator poles can be energised in sequence so that the magnetic field of the stator "leads" the rotor pole to rotate.

SR motors can provide significant advantages. They are robust and low cost due to simple stator windings and geometry. They cannot however be connected direct to an AC supply. The power electronics and control needed to drive an SR motor are a significant cost, and it has generally been thought that the way to reduce this cost is to use power electronics having a lower number of switches per phase.

SUMMARY OF THE INVENTION

Embodiments of the present disclosure relate to SR motors, and their control. Different types of SR motors exist. SR motors may be "fully pitched", or "short pitched". In a "short pitched" SR motor each stator tooth has a coil wrapped around it. For example, in a three phase short pitched SR motor the coil on every third stator tooth is connected together, either in series or in parallel, to form one phase winding. In a "short pitched" SR motor the torque is generated from the self-inductance of the windings. The effects of the self-inductance of each phase winding dominate (e.g. are much greater than) the mutual inductance between phase windings. In "fully pitched" SR motors each winding is distributed between the stator teeth, and may be wound on as many stator teeth as there are phases in the power supply. As a result there is flux coupling between the windings of different phases, and the variation in mutual coupling between two excited phases of the motor is used to provide torque in the rotor.

The torque developed in an SR motor may be expressed as follows:

$$T = \frac{1}{2} i_a^2 \frac{dL_a}{d\theta} + \frac{1}{2} i_b^2 \frac{dL_b}{d\theta} + \frac{1}{2} i_c^2 \frac{dL_c}{d\theta} + \\ i_a i_b \frac{dM_{ab}}{d\theta} + i_b i_c \frac{dM_{bc}}{d\theta} + i_c i_a \frac{dM_{ca}}{d\theta}$$

Equation (1)

In Equation 1 the subscripts (a, b, c) indicate the first second and third phases respectively. $L_a$, $L_b$, $L_c$ indicate the self-inductance of each phase of the windings, and $M_{ab}$, $M_{bc}$, $M_{ca}$ indicates the mutual inductance of the phases indicated by the subscripts.

In a short pitched SR motor, the self-inductance terms dominate (L>>M), so the torque does not depend on the direction (sign) of the current. By contrast, in fully pitched SR motors, the mutual inductances dominate, and the control of the relative directions (signs) of the currents determine the torque.

There exists a prejudice in the art that, as the direction of current is unimportant in a short pitched SR motor, to reduce the cost of drive circuitry it is best to use asymmetric bridges in which lower cost diodes carry the current in the "freewheel" period, and current flows in one direction through each phase winding. This reduces the number of (more expensive) power transistors that need to be used. When an SR motor is stationary and required to produce large torque starting from rest, in a conventional, asymmetric, SR drive the switching devices (such as controllable impedances, e.g. power transistors) of the drive only carry current for a short time whilst the diodes carry the current almost all of the time.

By contrast, embodiments of the present disclosure aim to reduce the power burden carried by the switching devices in a controller for a short pitched SR motor. This may enable the use of switching devices with lower power tolerance and/or may extend the working life of switching devices.

Embodiments of the disclosure employ a symmetric bridge, in which, under the same conditions, the direction of the voltage bias applied by the drive to the phase winding can be reversed between cycles of the motor. Accordingly, the current can be shared out between a greater number of devices so the average current per device can be reduced.

This may be achieved by balancing the thermal load carried by each device, for example the switching cycles may be chosen so that a similar, for example approximately equal or equal, amount of power is dissipated by each device when averaged over a large number of cycles. This can enable devices with a lower current rating to be used. In addition, because power loss can be shared more equally amongst power devices this may improve heat distribution in the drive and facilitate cooling.

One embodiment which aims to achieve this comprises a motor controller adapted to control the current in a phase winding of a short pitched SR motor. This motor controller comprises a voltage provider comprising controlled impedances arranged to provide an H-Bridge. The voltage provider is configured to be coupled to the phase winding and operable to selectively apply voltage to the winding to drive current in the phase winding in a first direction and in a second direction opposite to the first direction. A controller of the voltage provider is configured so the direction of the applied voltage alternates between the first direction and the second direction. This alternation may take place over one or more successive cycles of the motor, and the timing of the reversals may be selected so that, over a large number of cycles, the thermal load in the bridge is evenly shared between the controlled impedances (for example the power dissipated in each controlled impedance of the H-bridge) may be equal, for example the controller may be adapted to reduce the time average of the current through the winding by balancing negative and positive (first and second direction) currents through the winding.

When a SR motor is operating over the speed and torque range both motoring and generating the duty cycle and current profile varies. In a conventional SR machine the switch devices and didoes have duty cycles which cover a wide range. These devices therefore have to be rated for the worst case operating points. Embodiments of the disclosure employ bipolar (e.g. bidirectional) currents in the phase windings of the motor. Accordingly, the average current can be distributed more evenly between switching devices (such as controlled impedances) in the drive, and the worst case average current per device is reduced and so devices with a lower current rating can be used.

Embodiments of the disclosure use centre aligned PWM to reduce the energy loss in each switching device when the motor is at low or zero speed. The benefit of this may reduce as motor speed increases, however in some embodiments the direction of the current in a phase winding can be alternated between cycles and this distributes the losses at greater speed as the benefits of using centre aligned PWM are reduced. Therefore, the combination of centre aligned PWM (which need not be symmetric) and the use of bidirectional currents, provides a synergistic benefit.

BRIEF DESCRIPTION OF THE SEVERAL VIEWS OF THE DRAWINGS

Embodiments of the disclosure will now be described, by way of example only, with reference to the accompanying drawings, in which.

DESCRIPTION OF SPECIFIC EMBODIMENTS OF THE INVENTION

Figure 1:
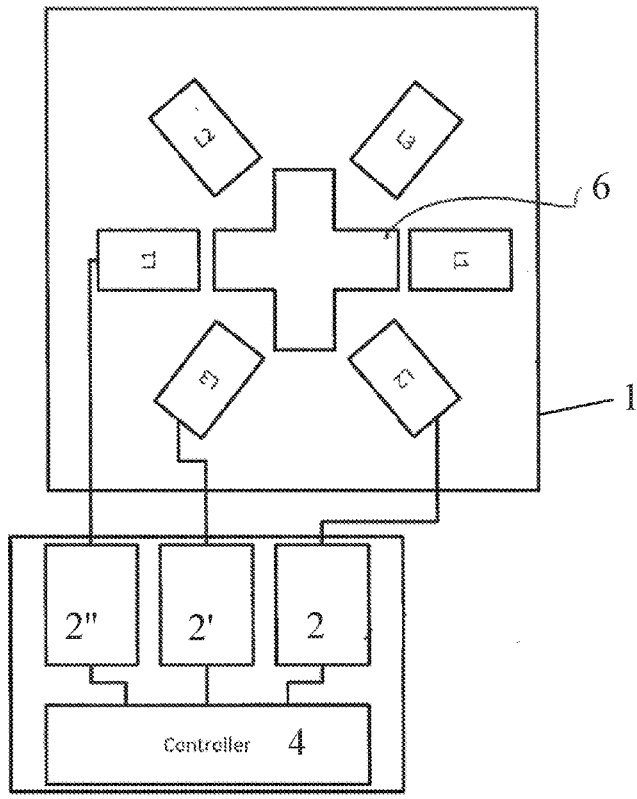
FIG. 1 shows a schematic diagram of an apparatus comprising an SR motor.

FIG. 1 shows an apparatus comprising a short pitched SR motor 1, and a control apparatus.

The SR motor 1 comprises a six pole stator, and a four pole rotor 6. The poles of the stator carry inductive windings, and the windings on opposing poles are coupled together in series.

The control apparatus comprises a controller 4 and three voltage providers. Each voltage provider 2 is coupled to one of the pairs of inductive windings carried on an opposing pair of poles of the stator. Each voltage provider 2 comprises a first output coupling and a second output coupling. Each opposing pair of stator windings is coupled between the first and second output coupling of a corresponding one of the voltage providers.

An encoder is coupled to the rotor 6, and an output of the encoder is coupled to the controller 4. The encoder is operable to sense the orientation of the rotor 6 and to provide a signal to the controller 4 indicating the sensed orientation.

The voltage providers are operable to apply a bidirectional voltage bias to the inductive windings to which they are each coupled, so that so that each voltage provider 2 is operable to control, and to reverse, the flow of current in one phase of the switched reluctance motor 1 by application of voltage to the winding. The controller 4 is configured to control the voltage providers to drive current, and change its direction, in the windings. The controller 4 is also arranged to obtain an indication of the orientation of the rotor 6 from the encoder, and to control the current in the phase windings of the SR motor 1 based on the sensed orientation.

In operation, when the rotor 6 is rotating, the controller 4 controls the voltage providers based on the encoder signal so that the flux applied by the stators rotates between the phases in a manner which "leads" the rotor 6 in rotation.

To control the power provided to each winding, the controller 4 uses pulse width modulation, PWM. To provide the pulses the controller 4 controls the first output coupling of one of the voltage providers to change the voltage of its first output coupling from a first voltage to a second voltage. After a selected delay, the controller 4 controls the second output coupling of that voltage provider 2 to change from the first voltage to the second voltage. Accordingly, during the delay, there is a voltage difference between the output couplings of the voltage provider 2. The controller 4 then controls the second output coupling to change back from the second voltage to the first voltage. After another selected delay, the controller 4 controls the first output coupling to change back from the second voltage to the first voltage. Again, during this delay, there is a voltage difference between the output couplings of the voltage provider 2. The voltage difference during these delays provides a pulse of current in the phase winding coupled to that voltage provider 2. If the two selected delays are equal, or approximately equal in length, this may be referred to as center aligned PWM.

When the rotor 6 is rotating, the controller 4 can control the voltage providers each to provide a series of pulses. The integral of each pulse is selected so that the power in the phase winding varies with time in a manner which is synchronised with the rotation of the rotor. The controller 4 modulates the pulses so the flux in each phase is angularly offset from the adjacent phase by $\pi/3$.

Details of each voltage provider 2 and the supply to a single phase of an SR motor 1 will now be described FIG. 2.

Figure 2:
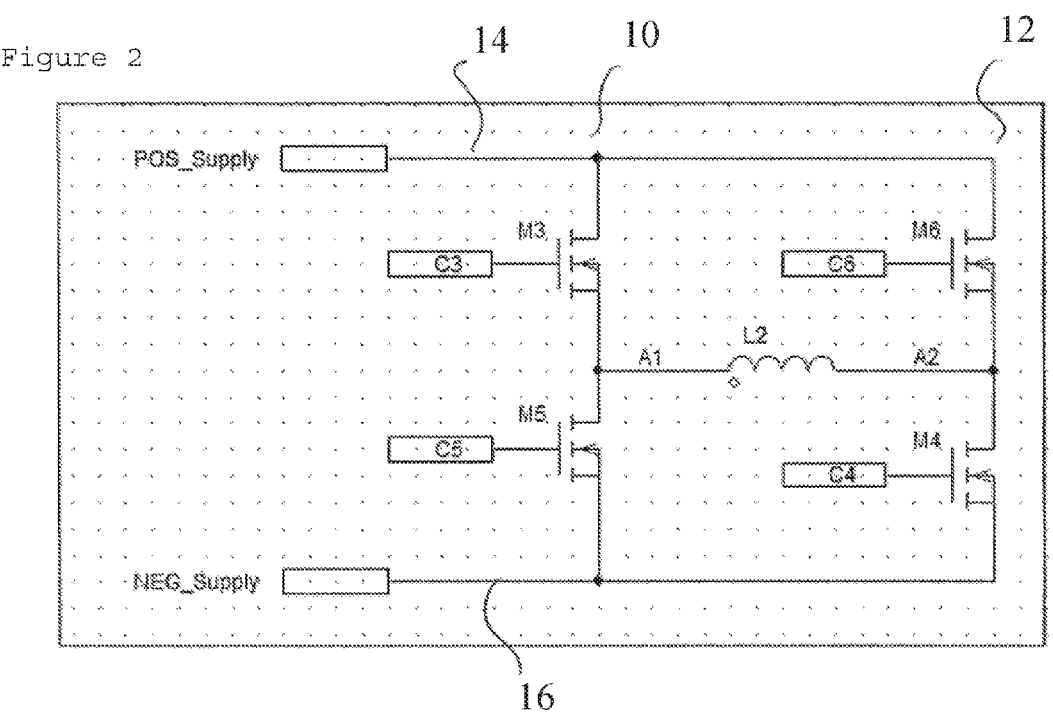
FIG. 2 shows a symmetric bridge for supplying power to a phase winding of an switched reluctance motor.

FIG. 2 shows an apparatus comprising a voltage provider 2 and a single phase winding L2 of an SR motor 1. The voltage provider 2 comprises a first leg 10, having a first output coupling A1, and a second leg 12 having a second output coupling A2. The first leg 10 and the second leg 12 are coupled in parallel between a positive supply voltage 14, and a negative supply voltage 16.

The first leg 10 comprises a first controlled impedance M3 and a second controlled impedance, M5. Each controlled impedance comprises a conduction path, and a control coupling. The conduction paths of the first and second controlled impedances M3, M5, are coupled together in series between the positive supply voltage 14, and a negative supply voltage 16. The control couplings C3 C5, of the controlled impedances M3, M5, are couplable to a controller 4 such as the controller 4 of FIG. 1 (not shown in FIG. 2). The first leg of the voltage provider 2 comprises a first output coupling arranged in series between the conduction paths of the first and second controlled impedances.

Similarly, the second leg 12 of the voltage provider 2 comprises a third controlled impedance, M4 and a fourth controlled impedance, M6. These two controlled impedances are coupled together in series, and the control couplings of these controlled impedances C4, C6, are couplable to a controller 4 such as the controller 4 of FIG. 1 (not shown in FIG. 2). A second output coupling, A2, is coupled in series between the conduction paths of the third controlled impedance and the fourth controlled impedance.

The phase winding L2 of the SR motor 1 is coupled between the first output coupling and the second output coupling of the voltage provider 2.

Each of the controlled impedances is operable to be switched into a conducting state, or into a non-conducting state by the application of a control signal to its control coupling.

The first leg is operable to control the voltage of the first output coupling based on control signals applied to the control couplings of the controlled impedances. The second leg is operable to control the voltage of the second output coupling based on control signals applied to the control couplings of the controlled impedances. By switching these impedances between conducting and non-conducting states, the voltages of the output couplings can be switched to enable current to be pushed or pulled in either direction through the phase winding of the SR motor 1.

In operation, the control signal provided to the second controlled impedance is the inverse of the control signal provided to the first controlled impedance. Likewise, the control signal provided to the second controlled impedance is the inverse of the control signal provided to the first controlled impedance. The controller 4 switches the controlled impedances M3, M4, M5, M6, between conducting and non-conducting (low impedance and high impedance states) thereby using the high and low supply voltages 14, 16 to control the voltage applied to the phase winding L2. The difference between the voltage at the first output coupling and the second output coupling applies a voltage bias to the phase winding.

Figure 3A:
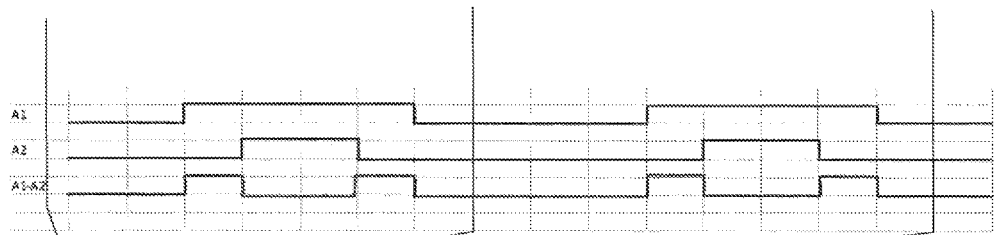
FIG. 3A shows a pulse width modulation scheme.

As illustrated in FIG. 3A, below, by driving the first coupling, A1, high, and after a first delay, driving the second output coupling, A2, high, the controller 4 applies a voltage pulse, A1-A2, to the phase winding L2 for the duration of this first delay. The controller then drives the second output coupling low and, after a second delay, drives the second output coupling low. Again, for the duration of this second delay a voltage pulse, A1-A2, is applied to the phase winding L2. Controlling the delays between the rise and fall of the first and second output coupling respectively controls the width (duration) of the voltage pulses applied to the phase winding. This enables center aligned pulse width modulation to be applied to control the voltage applied to the phase winding L2.

This operation of a single phase of a short pitched SR motor 1 (e.g. as shown in FIG. 2) will now be described with reference to FIG. 2 and FIG. 3A and FIG. 3B which shows a very schematic timing diagram of the signals present in the circuit illustrated in FIG. 2.

FIG. 3A shows a plot of voltage against time plot indicating three voltage traces. These three traces indicate the modulation of pulses applied to the phase winding shown in FIG. 2 during two time slices. A plot of power against time for one phase winding of the SR motor 1 is shown in FIG. 3B.

Referring now to FIG. 3A, the first trace shows voltage variations over time at the first output coupling, A1, of the voltage provider 2 illustrated in FIG. 2. The second trace shows voltage variations over time at the second output coupling, A2, of the voltage provider 2 illustrated in FIG. 2. The third trace shows the variation of voltage applied to the phase winding over time by the voltage difference A1-A2, between the first output coping and the second output coupling. Varying the time integral of this voltage difference in turn varies the power applied to the phase winding. Accordingly, by modulating the relative widths of the pulses at A1 and A2, the length of the resultant two pulses applied to the phase winding, A1-A2, can be varied to control the power transferred to the phase winding.

Figure 3B:
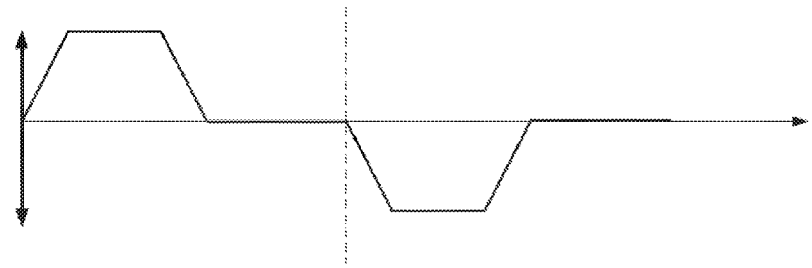
FIG. 3B shows a pulse width modulated signal provided by the scheme of FIG. 3A.

FIG. 3B shows a plot of current against time for a phase winding of the short pitched SR motor shown in FIG. 1. FIG. 3B schematically illustrates two successive cycles of the SR motor. In the first cycle the current is applied in a positive sense (corresponding to a flow of current in a first direction in the phase winding). During a second cycle, the current is applied in a negative sense (corresponding to a flow of current in a second direction, opposite to the first direction, in the phase winding). As illustrated, each cycle of the SR motor may comprise a large number of the time slices of the PWM cycle shown in FIG. 3A. However, in some implementations a single cycle of the motor may comprise only a single one of the time slices (e.g. a single PWM cycle) illustrated in FIG. 3A.

The controller 4 is configured to provide current in the phase winding in a first direction for a number of cycles of the motor 1, and then to reverse the direction of the current in the winding for a number of cycles. The direction of the current may be reversed every cycle, or it may be reversed less frequently, the reversals may be periodic, or intermittent, or triggered by an operational condition of the voltage provider 2 or the motor 1, for example based on an encoder measurement, or heat sensed in the voltage provider 2.

As will be appreciated by the skilled addressee in the context of the present disclosure, the voltage providers 2, 2', 2" illustrated in FIG. 1 may each comprise a voltage provider such as that illustrated in FIG. 2. The controller 4 of FIG. 1 may be configured to control the direction of current in one phase winding of the short pitched switched reluctance motor based on the direction of current in another one of the phase windings. For example, although the mutual inductance terms, M, in Equation 1 are generally very small with respect to the self-inductance, L, of each winding, the controller may be configured to use current reversals to control the sign of the applied currents in these windings. This may enable the controller to make selected adjustments in the torque produced by the motor. For example, the controller may be configured to reverse the current in one or more of the windings with a timing selected to reduce torque ripple in the motor. For example, the reversals of current in the phase windings may be selected to coincide with a frequency of the torque ripple, or a sub-harmonic, or a harmonic of the torque ripple. In some embodiments the timing of the reversals may be selected to increase the torque output from the motor, for example so that the contribution of mutual inductance to the torque combines additively with the contribution of the self-inductance. The controller may also be configured to apply one or more current reversals, or to select the frequency of current reversals based on detecting a magnetic saturation condition in the motor.

As will be appreciated by the skilled addressee in the context of the present disclosure, the energy losses in a voltage provider 2 such as the voltage provider 2 shown in FIG. 2 may be attributed both to ohmic losses (associated with conduction) and losses associated with changing the impedance of the controlled impedances (so called switching losses). As can be seen in FIG. 3, using a centre aligned PWM approach means that the switching frequency of the voltage applied to the phase winding is twice the switching frequency of the controlled impedances. Because the motor 1 is subjected to a higher frequency pulse train, with reduced energy in each pulse, the torque ripple in the motor 1 and the acoustic noise generated by the motor 1 may both be reduced. Advantageously however this reduction may be achieved without increasing the switching losses that would otherwise be associated with increasing the frequency of the pulses in the PWM pulse train.

Figure 4:
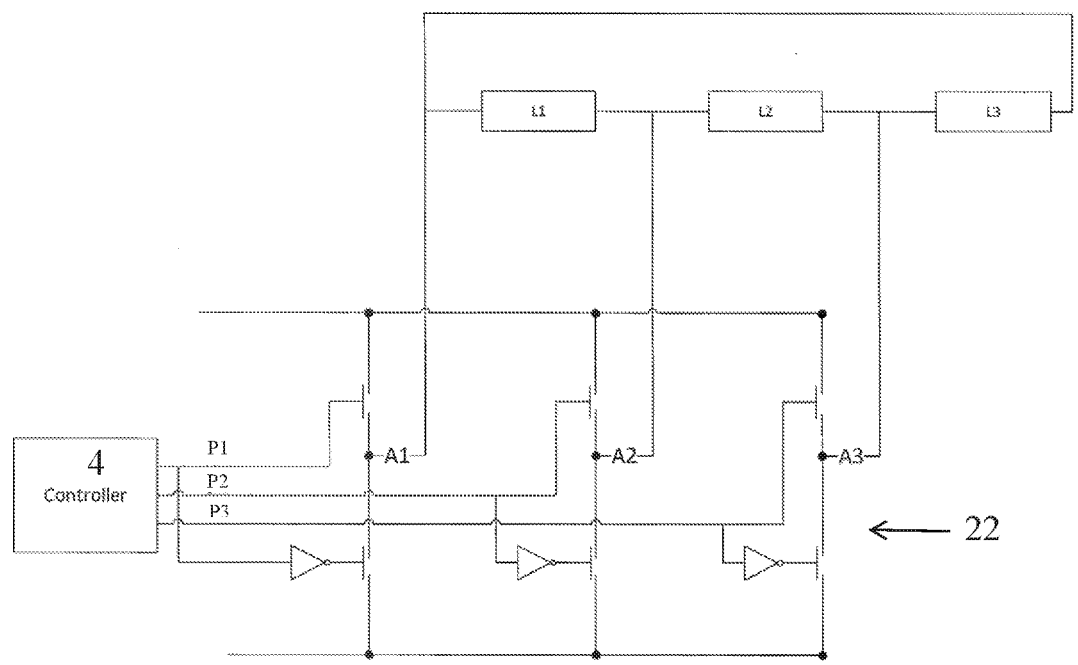
FIG. 4 shows a schematic circuit diagram of electronics for use in the apparatus shown in FIG. 1.

FIG. 4 shows another possible implementation of a circuit for use in the apparatus described above with reference to FIG. 1. As described above, each voltage provider 2 shown in FIG. 1 may comprise a bridge having four controlled impedances, for example an H-bridge. In some examples however, the controlled impedances of a three phase bridge may be shared between the three phase windings of an SR motor 1.

The apparatus of FIG. 4 comprises a controller 4, a three legged bridge 22, and a three phase short pitched SR motor 1. The SR motor 1 comprises three pairs of windings L1, L2, and L3, each pair corresponding to one phase. The controller 4 has three outputs, P1, P2, and P3.

Each leg of the bridge comprises first and second controlled impedances. Each controlled impedance comprises a conduction path, and a control coupling. The conduction paths of the first and second controlled impedances are connected together in series between a positive supply voltage, and a negative supply voltage. The control coupling of the first controlled impedance of the first leg is coupled to a first one of the controller 4 outputs, P1. The controller 4 output P1 is coupled to the control coupling of the second controlled impedance of the first leg by a voltage inverter (e.g. a NOT gate). The controlled impedances of the second and third legs are coupled in the same way to the second and third controller 4 outputs respectively.

The electrical points between the first and second controlled impedances of each leg provide three outputs A1, A2, A3, from the bridge. The first phase L1 of the SR motor 1 is coupled between the outputs A1, A2, of the first and second legs of the bridge. The second phase L2 of the SR motor 1 is coupled between the outputs A2, A3, of the second and third legs of the bridge. The third phase L3 of the SR motor 1 is coupled between the outputs A3, A1, of the third and first legs of the bridge. In operation, the controller 4 controls the outputs A1, A2 of the first and second legs of the bridge to provide the first and second voltage couplings of a first voltage provider 2 as described above with reference to FIG. 1. Similarly, the controller 4 controls the outputs A2, A3 of the second and third legs of the bridge to provide the first and second voltage couplings of a first voltage provider 2 as described above with reference to FIG. 1.

Other alternatives and variations of the examples described above will be apparent to the skilled addressee in the context of the present disclosure. For example the apparatus of FIG. 1 comprises an SR motor 1 having a six pole stator, and a four pole rotor 6 clearly this is merely exemplary, and motors and controllers having more or fewer poles and phases may be used.

The windings of each phase are described as being coupled together in series, however they may also be coupled in parallel. The phase windings may consist solely of passive components without the use of any active devices, such as diodes, to control the direction of current flow in the windings. The phase windings have been described as being carried by the stator, however in some embodiments the windings may be arranged on the rotor.

Although the apparatus of FIG. 1 is described as including an encoder this is optional. For example, while flux is being applied by one phase, the controller may be configured to use the inactive phase windings to sense the orientation of the rotor—e.g. based on the inductance in those phase windings. Other types of sensorless operation may be used. If an orientation sensor is used, it need not be an encoder, any type of orientation sensor may be used.

Controllable combination of current sources and/or current sinks may be arranged to push and/or pull current through the phase windings of an SR motor 1. H-bridges, including four controlled impedances per inductive winding may be used, or bridges including greater or lesser numbers of controlled impedances. Other methods and apparatus of current control may be used. The term "symmetric bridge" should not be taken to imply that the bridge is geometrically symmetric.

The term center aligned PWM may comprise any scheme in which two pulses of differing duration are additively combined and the start of the shorter of the two pulses is delayed with respect to the start of the longer pulse (e.g. to provide a voltage difference to be applied to a phase winding as in FIG. 1, and the voltage A1-A2 in FIG. 3A). The start and end of the two pulses are delayed with respect to each other, but these delays may be longer at the start than at the end of the pulse, so the alignment of the pulses need not be symmetric, e.g. the centers of the two pulses need not in fact be aligned. In some embodiments however the center aligned PWM is symmetric in that the start and end delays between the pulses are equivalent. The pulse width modulation may be fixed or variable frequency.

The controlled impedances may comprise either voltage controlled impedances, or current controlled impedances. They may comprise transistors, any of the following kinds of transistors may be used: insulated gate field effect transistor, IGFET, MOSFET, IGBT, RCIGBT, IGCT, GTO, JFET, HEMT or diode or a combination of these devices, or any other suitable power switching device. As will be appreciated in the context of the present disclosure, the controlled impedances may comprise switches. The controlled impedances may comprise a plurality of such impedances coupled in parallel.

It will also be appreciated that the term "H-Bridge" is used herein, but this should not be taken to imply any particular geometric arrangement. It will be appreciated by the skilled addressee that term H-bridge is derived from the typical graphical representation of such a circuit in a circuit diagram. An H bridge may comprise four controlled impedances which may be arranged two in each leg of bridge as described above. These legs may be symmetric in the sense that the controlled impedances each have similar characteristics, for example the electrical characteristics of each leg of the bridge may be the same, and within each leg the controlled impedances that couple the mid-point of the leg to the upper and lower supply rails respectively may also be the same.

Embodiments of the disclosure are adapted to modify torque output in a short pitched SR motor (either to reduce torque ripple, or to increase maximum torque output). This has been described above with reference to control of current reversals in the phase windings of the motor to manipulate the mutual inductance terms set out in Equation 1. One example of an embodiment which aims to achieve this comprises a system comprising at least a first apparatus according to any of claims 1 to 11 (set out below), and a second similar apparatus. The controllers (which may be provided by a common controller) are arranged to control the timing of the currents in respective first phase and second phase windings of a switched reluctance motor to drive the motor, for example by controlling the voltage provider of both the first apparatus and the second apparatus. For example, these embodiments of the disclosure may comprise a short pitched switched reluctance motor control apparatus for controlling current in a first phase winding and a second phase winding of a short pitched switched reluctance motor. This apparatus comprises a first voltage provider configured to be coupled to the first phase winding and operable to selectively apply voltage to the first phase winding to drive current in the first phase winding in a first direction and in a second direction opposite to the first direction; a second voltage provider configured to be coupled to the second phase winding and operable to selectively apply voltage to the second phase winding to drive current in the second phase winding in a first direction and in a second direction opposite to the first direction; and a controller configured to control the first voltage provider and the second voltage provider to control the timing of the currents in the first phase winding and the second phase winding to drive the motor, and configured to adjust the torque output from the short pitched switched reluctance motor by selecting the timing of reversals in the direction of current in at least one of the first phase winding and the second phase winding. This adjustment of the torque output may be achieved, as noted above, by controlling the direction of current in different phase windings, and thereby controlling the sign of the mutual inductance contributions (the cross terms) in Equation 1.

It will be appreciated by the skilled addressee in the context of the present disclosure that where reference is made to "cycles" electrical cycles are intended, rather than mechanical cycles of the motor.

The controller 4 may comprise any digital logic, such as field programmable gate arrays, FPGA, application specific integrated circuits, ASIC, a digital signal processor, DSP, or by any other appropriate hardware. In addition, all of the methods described herein may be embodied as computer program products operable to program programmable motor 1 control apparatus to perform these methods. These computer program products may be carried on non-transitory computer readable storage media and may be distributed as computer readable data carriers, which may include signals transmitted over a network.

Any feature of any one of the examples disclosed herein may be combined with any selected features of any of the other examples described herein. For example, features of methods may be implemented in suitably configured hardware, and the configuration of the specific hardware described herein may be employed in methods implemented using other hardware. In some examples the functionality of the controllers described herein may be provided by a general purpose processor, which may be configured to perform a method according to any one of those described herein.

The invention claimed is:

1. A short pitched switched reluctance motor control apparatus comprising:
   a voltage provider comprising a first coupling and a second coupling configured to be coupled to a phase winding of the switched reluctance motor for applying a voltage to drive current in the winding between the first and second coupling; and
   a controller configured to apply a first voltage pulse to the first coupling, and to apply a second voltage pulse to the second coupling, wherein the start of the second pulse is delayed with respect to the start of the first pulse, and the end of the first pulse is delayed with respect to the end of the second pulse in which the controller is configured to time the pulses so that the centre of the first pulse is aligned with the centre of the second pulse.

2. The control apparatus of claim 1 wherein the voltage provider is operable to selectively apply voltage to the winding to drive current in the phase winding in a first direction and in a second direction opposite to the first direction.

3. The apparatus of claim 2 in which the controller is configured to control the voltage provider so that the current in the phase winding flows in the first direction for at least one cycle of the switched reluctance motor and in the second direction for at least one cycle of the switched reluctance motor.

4. The apparatus of claim 3 wherein the controller is configured to control the voltage provider so that the direction of the current alternates in successive cycles of the switched reluctance motor.

5. A short pitched switched reluctance motor control apparatus comprising:
   a voltage provider comprising a first coupling and a second coupling configured to be coupled to a phase winding of the switched reluctance motor for applying a voltage to drive current in the winding between the first and second coupling in which the first coupling is coupled to a first supply voltage and to a second supply voltage by controlled impedances; and
   a controller configured to apply a first voltage pulse to the first coupling, and to apply a second voltage pulse to the second coupling, wherein the start of the second pulse is delayed with respect to the start of the first pulse, and the end of the first pulse is delayed with respect to the end of the second pulse wherein the controller is operable to control the controlled impedances to control the voltage at the first coupling.

6. A short pitched switched reluctance motor control apparatus comprising:
   a voltage provider comprising a first coupling and a second coupling configured to be coupled to a phase winding of the switched reluctance motor for applying a voltage to drive current in the winding between the first and second coupling in which the second coupling is coupled to a first supply voltage and to a second supply voltage by controlled impedances; and
   a controller configured to apply a first voltage pulse to the first coupling, and to apply a second voltage pulse to the second coupling, wherein the start of the second pulse is delayed with respect to the start of the first pulse, and the end of the first pulse is delayed with respect to the end of the second pulse, wherein the controller is operable to control the controlled impedances to control the voltage at the second coupling.

7. The apparatus of claim 6 wherein the controlled impedances are arranged to provide a symmetric bridge such as an H-bridge.

8. The apparatus of claim 6 wherein the controller is configured to control the voltage provider to select the direction of current in the phase winding in successive cycles of the switched reluctance motor so as to balance the thermal load placed on the controlled impedances.

9. A short pitched switched reluctance motor control apparatus comprising:
   a voltage provider comprising a first coupling and a second coupling configured to be coupled to a phase winding of the switched reluctance motor for applying a voltage to drive current in the winding between the first and second coupling; and
   a controller configured to apply a first voltage pulse to the first coupling, and to apply a second voltage pulse to the second coupling, wherein the start of the second pulse is delayed with respect to the start of the first pulse, and the end of the first pulse is delayed with respect to the end of the second pulse;

wherein the voltage provider comprises controlled impedances arranged to provide an H-bridge, for example wherein the H-bridge is arranged to be electrically symmetric about a phase winding coupled to the voltage provider.

10. A of controlling a short pitched switched reluctance motor, the method comprising:

providing a first voltage pulse to a first coupling of a phase winding of the switched reluctance motor, providing, to a second coupling of the phase winding, a second voltage pulse, delayed with respect to the start of the first pulse and wherein the end of the first voltage pulse is delayed with respect to the end of the second voltage pulse; and wherein the voltage pulses are timed so that the centre of the first pulse is aligned with the centre of the second pulse.

11. The method of claim 10 comprising selecting the voltages of the first voltage pulse and the second voltage pulse so that current through the phase winding flows in a first direction for at least one cycle of the switched reluctance motor before flowing in a second direction, opposite to the first direction, for at least one cycle of the switched reluctance motor.

12. The method of claim 11 comprising alternating the direction of the current in successive cycles of the switched reluctance motor.

13. A tangible non-transitory computer-readable media carrying program instructions configured to program a processor of an electric motor controller to perform a method according to claim 10.

14. A method of controlling current in a phase winding of a short pitched switched reluctance motor so that the current through the phase winding flows in the first direction for at least one cycle of the switched reluctance motor before flowing in the second direction for at least one cycle of the switched reluctance motor, further comprising alternating the direction of the current between successive cycles of the motor, wherein controlling the current comprises controlling a plurality of controlled impedances arranged to provide a an H-bridge for controlling the phase winding, the method further comprising selecting the alternation of current so as to balance thermal load placed on the controlled impedances.

15. A tangible non-transitory computer-readable media carrying program instructions configured to program a processor of an electric motor controller to perform a method according to claim 14.

16. A system comprising at least a first apparatus and a second apparatus, wherein the first and second apparatus each comprise a short pitched switched reluctance motor control apparatus comprising:

a voltage provider comprising a first coupling and a second coupling configured to be coupled to a phase winding of the switched reluctance motor for applying a voltage to drive current in the winding between the first and second coupling; and a controller configured to apply a first voltage pulse to the first coupling, and to apply a second voltage pulse to the second coupling, wherein the start of the second pulse is delayed with respect to the start of the first pulse, and the end of the first pulse is delayed with respect to the end of the second pulse;

wherein the controllers of the first apparatus and the second apparatus are arranged to control the timing of the currents in respective first phase and second phase windings of a switched reluctance motor to drive the motor, for example wherein the controllers are provided by a common controller adapted to control the voltage provider of both the first apparatus and the second apparatus, and wherein the controllers are configured to adjust the torque output from a short pitched SR motor by selecting the timing of a reversal in the direction of current in at least one of the first and second phase windings, wherein the torque adjustment is selected to reduce torque ripple and wherein the frequency of current reversals is selected based on the frequency of the torque ripple, wherein the timing of the current reversals is selected so that the contribution of the mutual inductance between the first and second phase windings combine additively with the contribution of the self-inductance to one of:

(a) increase the torque output from the motor; and (b) reduce torque ripple.

* * * * *